(12) United States Patent
Mikolajek

(10) Patent No.: US 10,883,621 B2
(45) Date of Patent: Jan. 5, 2021

(54) VALVE

(71) Applicant: CONTINENTAL AUTOMOTIVE GMBH, Hannover (DE)

(72) Inventor: Carsten Mikolajek, Griesheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/907,694

(22) Filed: Feb. 28, 2018

(65) Prior Publication Data

US 2018/0187792 A1 Jul. 5, 2018

Related U.S. Application Data

(63) Continuation of application No. PCT/EP2016/067746, filed on Jul. 26, 2016.

(30) Foreign Application Priority Data

Aug. 31, 2015 (DE) .................. 10 2015 216 640

(51) Int. Cl.

| F16K 31/04 | (2006.01) |
|---|---|
| F16K 31/44 | (2006.01) |
| F16K 31/53 | (2006.01) |
| F16H 19/06 | (2006.01) |
| F02M 26/54 | (2016.01) |
| F02M 26/67 | (2016.01) |

(52) U.S. Cl.
CPC .......... F16K 31/047 (2013.01); F02M 26/54 (2016.02); F02M 26/67 (2016.02); F16H 19/06 (2013.01); F16K 31/44 (2013.01); F16K 31/53 (2013.01)

(58) Field of Classification Search
CPC .. F16H 19/06; F16H 19/0613; F16H 19/0618; F16H 2019/0627; F16K 31/047; F16K 31/44; F16K 31/52; F16K 31/53
USPC ...................................... 251/129.11
See application file for complete search history.

(56) References Cited

U.S. PATENT DOCUMENTS

| 2,916,922 A | 12/1959 | Sorensen |
|---|---|---|
| 3,044,312 A * | 7/1962 | Hall .......... B66D 3/02 211/103 |
| 3,955,792 A * | 5/1976 | Cho ...... F16K 31/047 251/69 |

(Continued)

FOREIGN PATENT DOCUMENTS

| CN | 2654993 Y | 11/2004 |
|---|---|---|
| CN | 101906769 A | 12/2010 |

(Continued)

*Primary Examiner* — Seth W. Mackay-Smith

(57) ABSTRACT

The invention relates to a valve for opening and closing a flow path, comprising a drive motor, comprising a valve disk, comprising a valve tappet and comprising a transmission device for converting rotational movement of the drive motor into translatory movement of the valve disk, wherein the valve disk is connected to the valve tappet and is able to be moved by way of movement of the valve tappet, wherein the transmission device is formed from flexible elements and at least one toothed segment which is mounted so as to be rotatable about an axis of rotation, wherein only tensile forces are able to be transmitted by the flexible elements, and wherein the toothed segment is able to be at least partially wrapped around by the flexible elements by way of rotational movement.

9 Claims, 2 Drawing Sheets

(56) References Cited

U.S. PATENT DOCUMENTS

| | | | | |
|---|---|---|---|---|
| 4,425,823 | A | * | 1/1984 | Kulischenko ............ F16K 31/05 |
| | | | | 137/595 |
| 4,613,798 | A | * | 9/1986 | Baumann .............. F16K 31/046 |
| | | | | 251/129.11 |
| 2004/0169112 | A1 | * | 9/2004 | Grossart ............. F16H 19/0622 |
| | | | | 244/233 |
| 2012/0003559 | A1 | * | 1/2012 | Frenal ............... F02M 35/10216 |
| | | | | 429/444 |
| 2012/0312107 | A1 | | 12/2012 | Lestienne et al. |
| 2014/0191145 | A1 | * | 7/2014 | Aughton ................... E02B 7/42 |
| | | | | 251/213 |
| 2014/0311464 | A1 | * | 10/2014 | Sano ...................... F02M 26/53 |
| | | | | 123/568.11 |
| 2016/0288319 | A1 | | 10/2016 | Kfoury et al. |

FOREIGN PATENT DOCUMENTS

| | | | |
|---|---|---|---|
| CN | 104455678 | A | 3/2015 |
| CN | 204312822 | U | 5/2015 |
| DE | 102005006864 | A1 | 8/2006 |
| EP | 1372128 | A2 | 12/2003 |
| JP | S61-11694 | U | 1/1986 |
| JP | S61233279 | A | 10/1986 |
| JP | H09-20423 | A | 5/1997 |
| JP | 2013096266 | A | 5/2013 |
| KR | 1020120092720 | A | 8/2012 |
| WO | 0216698 | A1 | 2/2002 |
| WO | 2014/161796 | A1 | 10/2014 |

* cited by examiner

VALVE

CROSS-REFERENCE TO RELATED APPLICATIONS

This application claims the benefit of PCT Application PCT/EP2016/067746, filed Jul. 26, 2016, which claims priority to German Patent Application 10 2015 216 640.6, filed Aug. 31, 2015. The disclosures of the above applications are incorporated herein by reference.

FIELD OF THE INVENTION

The invention relates to a valve for opening and closing a flow path, comprising a drive motor, comprising a valve disk, comprising a valve tappet and comprising a transmission device for converting rotational movement of the drive motor into translatory movement of the valve disk, wherein the valve disk is connected to the valve tappet and is able to be moved by way of movement of the valve tappet.

BACKGROUND OF THE INVENTION

In numerous application areas, rotational movements of a drive motor are converted into linear or translatory movement for the purpose of actuating a valve. This principle is also applied for example in valves for controlling exhaust gas recirculation in motor vehicles. For this purpose, use is often made of a gear transmission which converts the rotational movement into linear or translatory movement by way of a corresponding kinematic mechanism. The conversion of the rotational movement may be realized for example via a crank drive or a slotted link gear mechanism.

A disadvantage of such devices is in particular that unwanted transverse forces arise, which are transmitted to the valve tappet or to the valve disk. This leads to greater wear and to a reduced lifetime. Also, jamming of the valve may occur.

SUMMARY OF THE INVENTION

The problem addressed by the present invention is therefore that of providing a valve in which rotational movement of a drive motor is converted into linear movement, with the resulting transverse forces and torques at the valve tappet being, as far as possible, at a minimum.

The problem regarding the valve is solved by a valve having the features of claim 1.

An exemplary embodiment of the invention relates to a valve for opening and closing a flow path, comprising a drive motor, comprising a valve disk, comprising a valve tappet and comprising a transmission device for converting rotational movement of the drive motor into translatory movement of the valve disk, wherein the valve disk is connected to the valve tappet and is able to be moved by way of movement of the valve tappet, wherein the transmission device is formed from flexible elements and at least one toothed segment which is mounted so as to be rotatable about an axis of rotation, wherein only tensile forces are able to be transmitted by the flexible elements, and wherein the toothed segment is able to be at least partially wrapped around by the flexible elements by way of rotational movement.

Particularly preferably, the transmission device is mounted rotatably such that the toothed segment is driven via a gear mechanism or directly by a drive motor, such as in particular an electric motor. By way of the rotational movement produced at the toothed segment, it is possible for winding on or winding off of the flexible elements, which are likewise connected to the valve tappet, to be achieved at the toothed segment, whereby, finally, translatory movement of the valve tappet is produced.

The toothed segment may be structurally embodied in many different ways. It is essential that the movement of the drive motor transmitted by drive wheels is transmitted to the toothed segment, for example by way of a toothing provided between the toothed segment and the drive wheel, and furthermore the toothed element is suitable for transmitting the movement to the valve tappet by means of flexible elements. For this purpose, the toothed segment may in particular be produced from a plurality of individual elements or at least have multiple regions which are each assigned to different functions. For example, an arc element for transmitting the movement from the drive wheels, and disk-shaped elements for attaching the flexible elements.

The flexible elements are preferably for example Bowden cables, which are in particular characterized in that, substantially, they may transmit only tensile forces and may transmit only very small or absolutely no pushing forces. It is possible by way of a suitable arrangement of at least two flexible elements for the movement of the toothed segment to thus be transmitted to the valve tappet in both directions of rotation.

The rotation of the toothed segment allows partial wrapping around with one or both flexible elements to occur in that the flexible elements are practically wound onto the toothed segment. Depending on the direction of rotation, an already wound-on flexible element may be wound off the toothed segment.

It is particularly advantageous if the transmission device has at least two flexible elements, wherein, by way of rotational movement of the toothed segment in one direction, that proportion of the toothed segment which is wrapped around by the at least first flexible element is able to be increased and that proportion of the toothed segment which is wrapped around by the at least second flexible element is able to be reduced.

This is particularly advantageous if the rotational movement of the drive motor in both directions of rotation is in each case to be transmitted to the toothed segment and, finally, also to the valve tappet. Here, in each case one of the flexible elements is intended for the transmission of force in each case one direction. In the case of clockwise rotational movement, one of the flexible elements is subjected to tensile load, while the in each case other one is relieved of load. In the case of a reversal of direction of rotation, the in each case initially unloaded flexible element is subjected to tensile load, and the initially loaded flexible element is relieved of load.

It is also advantageous if the toothed segment has two grooves which extend in an encircling manner in the circumferential direction at the outer circumference, wherein the flexible elements are at least partially guided through the grooves.

Due to the grooves, it is possible to prevent the flexible elements slipping off at the toothed segment. Also, better conversion of the rotational movement into translatory movement is achieved since the flexible elements have less freedom of movement, and consequently the play in the entire device is reduced. The flexible elements are able to wrap around the toothed segment in a guided manner in the grooves, as a result of which greater stability is achieved overall. If multiple flexible elements are provided, it is also possible to prevent overlapping of the flexible elements by way of the grooves. The unwanted generation of transverse forces and disruptive moments may thus also be prevented. Transverse forces are in particular forces which act transversely to the desired direction of movement of the valve tappet and thus make movement more difficult or lead to jamming of the valve tappet or the valve disk. Disruptive moments are in particular moments which likewise lead to movement of the valve tappet and the valve disk which deviates from the desired direction of movement.

A preferred exemplary embodiment is characterized in that the toothed segment is formed from two disk-shaped elements which are connected rigidly to one another, wherein the first disk-shaped element is arranged on the left of the valve tappet and the second disk-shaped element is arranged on the right of the valve tappet, wherein each of the disk-shaped elements has two grooves which extend in the circumferential direction parallel to one another at the outer circumference, wherein a flexible element is guided in each of the grooves.

The disk-shaped elements are preferably arranged on the left and on the right of the valve tappet so as to be equally spaced apart from the central axis of the valve tappet. This is particularly advantageous for achieving a transmission of force which is uniform and free of transverse forces and disruptive moments. Each disk-shaped element has two grooves, with in each case one flexible element engaging in each of the grooves. Thus four flexible elements are provided in total, wherein in each case two flexible elements are provided for the transmission of force in the same direction. Preferably, in each case one flexible element transmits the clockwise rotational movement on the right and the left side of the valve tappet, and likewise in each case one flexible element transmits the counterclockwise rotational movement on the right and left, from the toothed segment to the valve tappet.

It is also preferable if each flexible element is in each case connected fixedly to the valve tappet and to the toothed segment. Firm attachment allows play-free transmission of force to be achieved.

It is furthermore advantageous if the in each case two flexible elements are arranged so as to be in opposite directions to one another. The arrangement in opposite directions is advantageous for being able to move the valve tappet both forward and backward. In each case one of the flexible elements is loaded with a tensile force for this purpose.

It is furthermore advantageous if the toothed segment is mounted so as to be rotatable about an axis of rotation, wherein the axis of rotation of the toothed segment is arranged in a tangential direction to the central axis of the valve tappet. As a result of such an arrangement of the toothed segment, or of the axis of rotation of the toothed segment, in comparison with the central axis of the valve tappet, it is achieved that the flexible elements are oriented exactly parallel to the direction of movement of the valve tappet. This is advantageous for preventing or at least minimizing the occurrence of unwanted transverse forces and disruptive moments.

It is furthermore expedient if the axis-to-axis distance between the axis of rotation of the toothed segment and the central axis of the valve tappet corresponds to half of the rolling-off diameter of the flexible elements on the toothed segment.

Such a design is particularly advantageous, because, as a result thereof, it is achieved that the flexible elements extend exactly parallel to the central axis of the valve tappet. In this case, the location of the neutral axis of the flexible elements, in particular, is considered to be important since this should be arranged exactly parallel to the central axis of the valve tappet in order to avoid transverse forces and disruptive moments. Here, viewed both from the side along the axis of rotation of the toothed segment and from above at a right angle to the axis of rotation of the toothed segment, the neutral axis should extend parallel to the central axis of the valve tappet.

It is furthermore advantageous if the flexible elements are formed by Bowden cables and/or cables and/or steel strips and/or scroll springs and/or chains and/or tension-resistant fabric strip.

It is furthermore expedient if the flexible elements are injection-molded into the toothed segment at their attachment point on the toothed segment. The injection-molding of the flexible elements into the toothed segment is particularly advantageous for achieving play-free transmission of force.

It is also advantageous if the spacings of the flexible elements to the central axis of the valve tappet on the right and on the left are symmetrical with respect to one another. A symmetrical arrangement of the flexible elements may in particular allow the generation of unwanted transverse forces and disruptive moments to be reduced or completely avoided. Transverse forces and disruptive moments could lead to jamming of the valve tappet or the valve disk. Moreover, the durability of the valve is reduced significantly.

In particular at the valve tappet, projections which project in the radial direction and to which the flexible elements are attached may be arranged. By way of suitable dimensioning, it may thus be achieved that the flexible elements extend exactly parallel to the central axis of the valve tappet.

It is furthermore preferable if at least one of the flexible elements is loaded with a preload force by a device, wherein the device is arranged at the toothed segment and/or at the valve tappet.

A device for generating a preload force may be formed for example by a spring or a spring-like element. The preload force serves in particular for minimizing or eliminating the play in the valve. The play arises due to production tolerances of the individual elements of the valve. A preload force allows the elements to be brought into abutment with one another such that the play is minimized or even completely eliminated.

Furthermore, it is advantageous if the flexible elements extend parallel to the central axis of the valve tappet. This is advantageous for avoiding the unwanted generation of transverse forces and disruptive moments.

Advantageous refinements of the present invention are described in the dependent claims and in the following description of the Figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be discussed in detail below on the basis of exemplary embodiments and with reference to the drawings, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
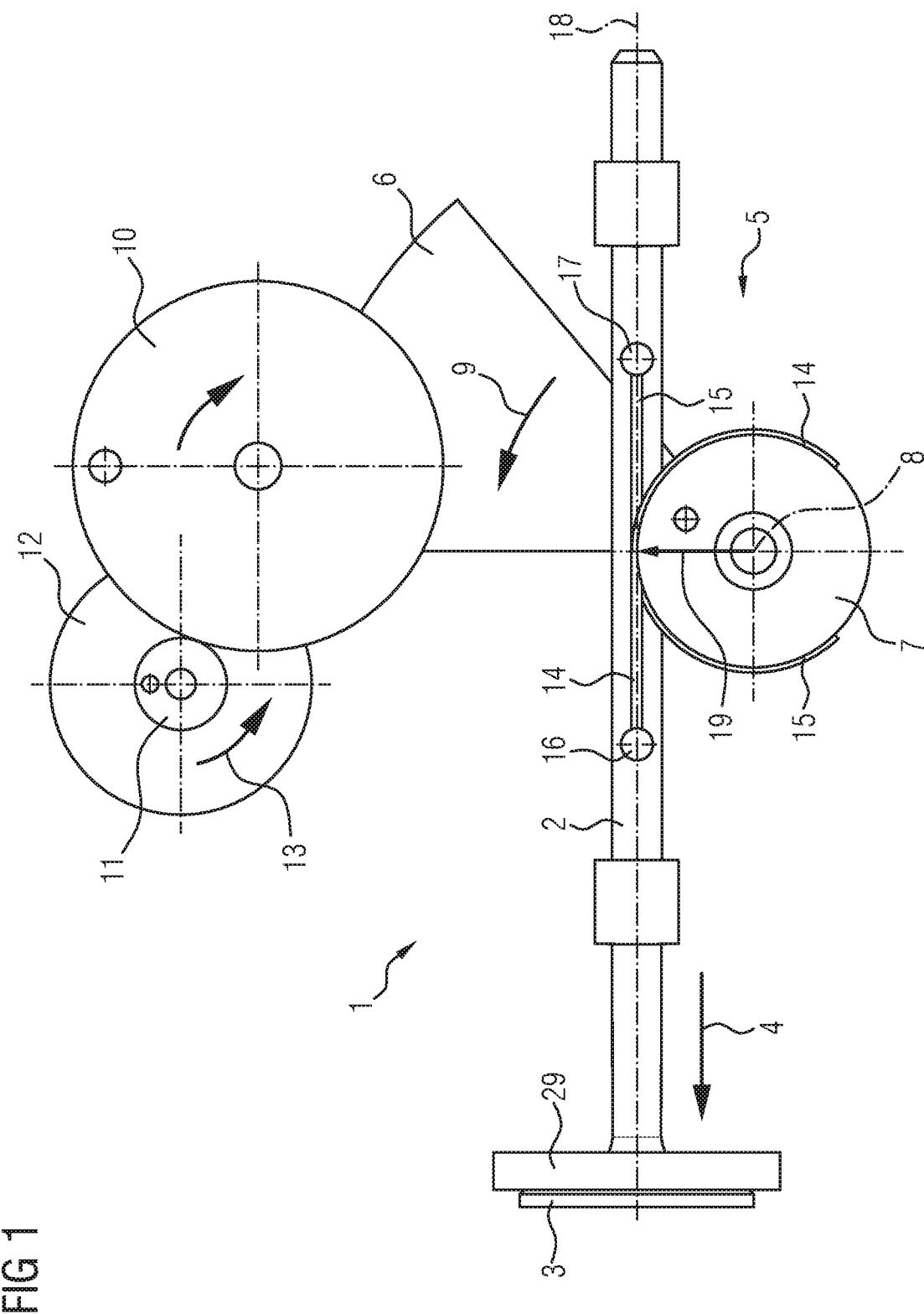
FIG. 1 shows a side view of a valve according to the invention, wherein, apart from the valve tappet and the toothed segment, a gearing stage formed from two drive wheels is also shown.

FIG. 1 shows a side view of a valve 1 according to the invention. The valve 1 is substantially formed from the valve tappet 2 and the valve disk 3 fastened thereto or formed in one piece with the valve tappet 2. In FIG. 1, a valve seat against which the valve disk 3 may be pressed is illustrated by a ring with the reference sign 29. The valve seat 29 is part of a flow path (not shown) which is closed off or opened up by the valve disk 3. The valve tappet 2 is moved along the direction indicated by the arrow 4 and also counter to this direction.

A toothed segment 5, which has the arc element 6 and two disk-shaped elements 7, is also shown. The toothed segment 5 is mounted so as to be rotatable about the axis of rotation 8, which is the surface normal to the plane of the drawing. The toothed segment 5 is rotated along the direction indicated by the arrow 9, and in the opposite direction, about the axis of rotation 8.

Drive wheels which form a gearing stage are shown with the reference signs 10 and 11. The drive wheel 11 is connected to the drive motor 12 and is driven by it both in the direction of the arrow 13 and in the opposite direction.

The drive wheel 10 rolls against the drive wheel 11. The rotational movement of the drive wheel 10 is finally transmitted to the arc element 6 of the toothed segment 5. The respective directions of rotation are determined in accordance with the principle of reversal of direction of rotation from drive wheel to drive wheel according to the illustrated arrows.

FIG. 1 furthermore illustrates two flexible elements 14 and 15 which are particularly advantageously designed as Bowden cables. The flexible elements 14 and 15 may in each case transmit only tensile forces. The flexible elements 14 and 15 are connected to the valve tappet 2 at the attachment points 16 and 17 in each case at one of their end regions, and to the disk-shaped element 7 at the in each case other end region. By way of rotational movement of the disk-shaped element 7 as a consequence of rotational movement of the drive motor 12 in the direction of the arrow 13, the wrapping around of the disk-shaped element 7 by the flexible element 15 is increased, while the wrapping around by the flexible element 14 is reduced. The valve tappet 2 is consequently moved along the arrow 4 to the left. Reversing the direction of rotation of the drive motor 12 would lead to an increase in the wrapping around of the disk-shaped element 7 by the flexible element 14 and to a reduction in the wrapping around by the flexible element 15. The valve tappet 2 would therefore be moved counter to the arrow 4 to the right.

In FIG. 1, it is seen particularly clearly that the attachment points 16 and 17 are arranged exactly at the height of the central axis 18 of the valve tappet 2. The flexible elements 14, 15 thus extend exactly parallel to the central axis 18. This is advantageous for not introducing transverse forces or disruptive moments into the valve tappet 2. It is furthermore seen that the axis of rotation 8 of the disk-shaped element 7 is arranged to be at exactly the same vertical distance from the central axis 18 of the valve tappet 2 as the radius 19 of the disk-shaped element 7. This contributes to the neutral axis of the flexible elements 14, 15 extending exactly at the height of the central axis 18, as a result of which the generation of unwanted transverse forces and disruptive moments may furthermore be avoided.

Figure 2:
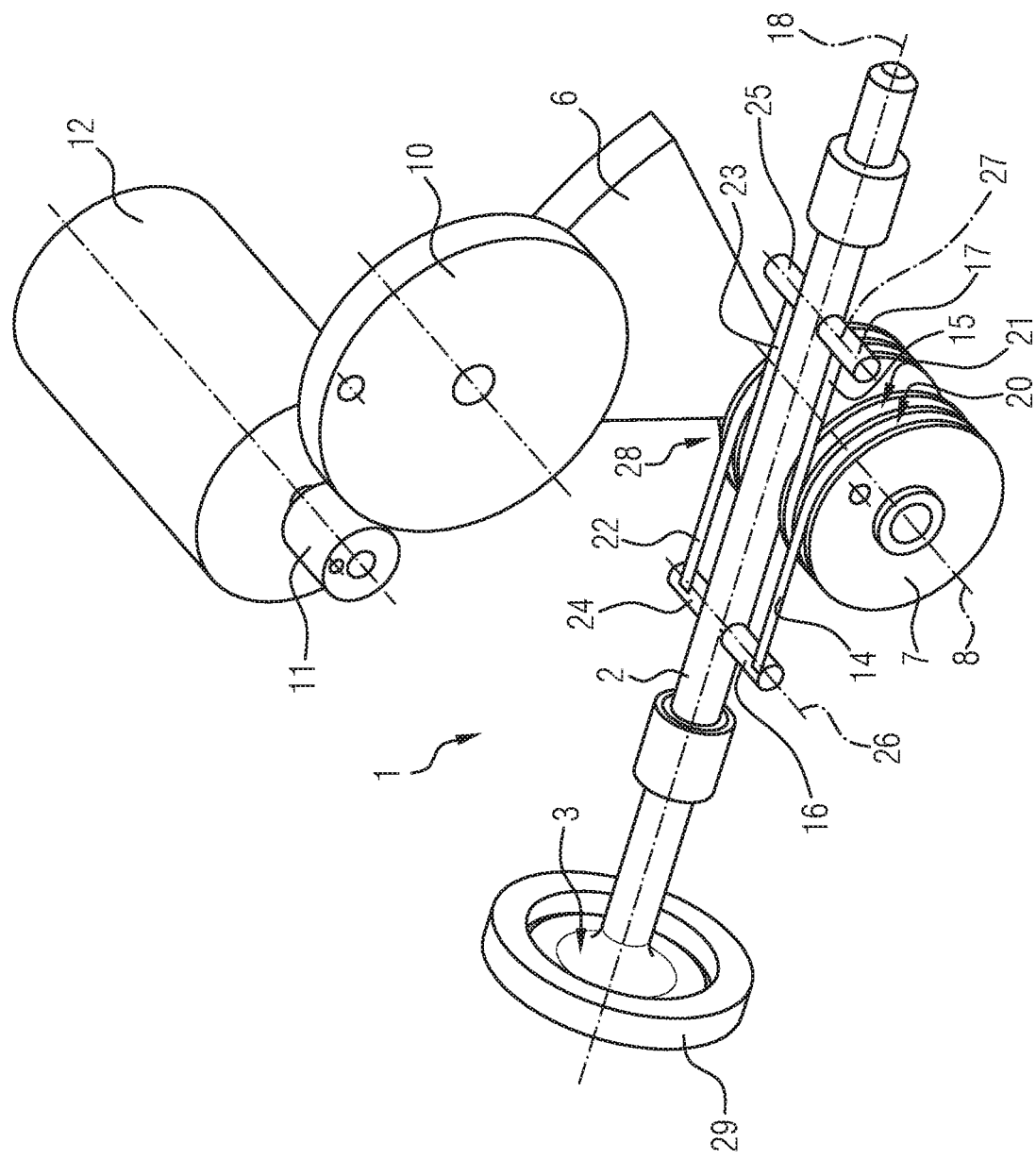
FIG. 2 shows a perspective view of FIG. 1, wherein in particular the arrangement of the flexible elements on the right and on the left of the valve tappet may be seen.

FIG. 2 shows a perspective view of the valve 1 of FIG. 1. Accordingly, the same reference signs have been used for identical parts and, as necessary, new reference signs have been introduced.

Additionally to FIG. 1, FIG. 2 shows two further flexible elements 22, 23. These are arranged on the right side of the valve tappet 2 and are connected to the valve tappet via the attachment points 24, 25. The attachment points 16 and 24 are arranged concentrically along an axis 26, wherein the axis 26 passes through the central axis 18 and is oriented parallel to the axis of rotation 8. The attachment points 17 and 25 are arranged concentrically along the axis 27, wherein the axis 27 is likewise arranged parallel to the axis of rotation 8 and likewise passes through the central axis 18.

Furthermore, an additional disk-shaped element 28 is arranged on the right side of the valve tappet 2. The disk-shaped elements 7 and 28 are connected rigidly to one another and are jointly mounted so as to be rotatable about the axis of rotation 8. Particularly preferably, the disk-shaped elements 7, 28 are identical.

The disk-shaped element 7 has two grooves 20, 21 which extend in the circumferential direction and in which the flexible elements 14, 15 are in each case at least partially guided. The grooves 20, 21 allow an orderly rolling on or rolling off of the flexible elements 14, 15 from the disk-shaped element 7. The disk-shaped element 28 is of mirror-symmetrical construction in relation to the disk-shaped element 7. The flexible elements 22, 23 are guided through grooves extending in the circumferential direction at the disk-shaped element 28.

Thus, overall, in each case two points of force action are defined at the valve tappet by the attachment points 16, 24 and 17, 25, which are arranged such that transmission of the forces from the drive motor 12 to the valve tappet 2 which is as uniform as possible is realized. Consequently, the generation of tilting moments and transverse forces at the valve tappet are almost completely avoided or reduced very greatly.

As is seen from FIGS. 1 and 2, the in each case two flexible elements 14, 15 or 22, 23 on one side of the valve tappet 2 are arranged so as to be in opposite directions, whereby both movement along the direction 4 and counter to the direction 4 may be achieved by way of the flexible elements 14, 15, 22 and 23, which may each transmit only tensile forces.

Via the arrangement of the attachment points 16, 24, 17 and 25 at the height of the central axis 18, and the exactly parallel arrangement of the flexible elements 14, 15, 22 and 23, it is achieved that the introduction of force into the valve tappet 2 occurs exactly along the direction of movement 4 of the valve tappet 2.

The exemplary embodiments of FIGS. 1 and 2 are in particular not of a limiting nature, and serve for illustrating the concept of the invention. Also, configurations extending beyond the specific configuration of FIGS. 1 and 2, in particular individual structural modifications, which follow the concept of the invention, are likewise encompassed by the scope of protection of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve for opening and closing a flow path, comprising:
    a drive motor;
    a valve disk;
    a valve tappet, the valve disk is connected to the valve tappet and is moved by way of movement of the valve tappet;
    a transmission device further comprising:
        a plurality of flexible elements and at least one toothed segment which is mounted so as to be rotatable about an axis of rotation, the transmission device able to convert rotational movement of the drive motor into translatory movement of the valve disk;
        a plurality of disk-shaped elements which are part of the at least one toothed segment, a first disk-shaped element of the plurality of disk-shaped elements is arranged on one side of the valve tappet, and a second disk-shaped element of the plurality of disk-shaped elements is arranged on an opposite side of the valve tappet and is rigidly connected to the first disk-shaped element of the plurality of disk-shaped elements, each of the first disk-shaped element of and the second disk-shaped element of the plurality of disk-shaped elements having two grooves which extend in a circumferential direction parallel to one another at an outer circumference of each of the plurality of disk shaped elements, and each of the plurality of flexible elements is guided in a corresponding one of the grooves on a respective one of the plurality of disk-shaped elements;
    wherein only tensile forces are transmitted by the plurality of flexible elements, and each of the plurality of disk-shaped elements is at least partially wrapped around by at least one of the plurality of flexible elements by way of rotational movement.

2. The valve of claim 1, the transmission device
    wherein, by way of rotational movement of the at least one toothed segment in one direction, that portion of the at least one toothed segment which is wrapped around by a first of the plurality of flexible elements is increased and that portion of the at least one toothed segment which is wrapped around by a second of the plurality of flexible elements is reduced.

3. The valve of claim 1, wherein the at least one toothed segment is mounted so as to be rotatable about the axis of rotation, wherein the axis of rotation of the toothed segment is arranged in a tangential direction to the central axis of the valve tappet.

4. The valve of claim 1, wherein each of the plurality of flexible elements is connected fixedly to the valve tappet and to a corresponding one of the plurality of disk-shaped elements.

5. The valve of claim 1, wherein each of the plurality of flexible elements is arranged so as to be in opposite direction to a corresponding flexible element.

6. The valve of claim 5, wherein the axis-to-axis distance between the axis of rotation of the at least one toothed segment and the central axis of the valve tappet corresponds to half of the rolling-off diameter of the plurality of flexible elements on the at least one toothed segment.

7. The valve of claim 1, the plurality of flexible elements further comprising at least one of Bowden cables, cables, steel strips, scroll springs, chains, and tension-resistant fabric strip.

8. The valve of claim 1, wherein each of the plurality of flexible elements are injection-molded into the at least one toothed segment at their attachment point on the at least one toothed segment.

9. The valve of claim 1, wherein the spacings of the plurality of flexible elements to the central axis of the valve tappet on the right and on the left are symmetrical with respect to one another.

* * * * *